United States Patent

Kameyama

[11] Patent Number: 5,803,758
[45] Date of Patent: Sep. 8, 1998

[54] SWITCH BOX MOUNTING STRUCTURE

[75] Inventor: Isao Kameyama, Shizuoka, Japan

[73] Assignee: Yazaki Corporation, Tokyo, Japan

[21] Appl. No.: 774,224

[22] Filed: Dec. 27, 1996

[30] Foreign Application Priority Data

Dec. 28, 1995 [JP] Japan ..................................... 7-342960

[51] Int. Cl.$^6$ .................................................. H01R 13/74
[52] U.S. Cl. ........................... 439/248; 439/533; 439/557
[58] Field of Search ..................................... 439/557, 558, 439/247, 248, 533, 534

[56] References Cited

U.S. PATENT DOCUMENTS

| 4,954,094 | 9/1990 | Humphrey | 439/247 |
| 5,123,862 | 6/1992 | Suzuki | 439/533 |
| 5,318,455 | 6/1994 | Villiers et al. | 439/248 |

FOREIGN PATENT DOCUMENTS 53-32969  3/1978  Japan .
6-333638  12/1994  Japan .

Primary Examiner—Gary F. Paumen
Attorney, Agent, or Firm—Sughrue, Mion, Zinn, Macpeak & Seas, PLLC

[57] ABSTRACT

A switch box mounting structure which allows easy removal of the switch box from the panel, reduces the length of the wires, improves the work efficiency, prevents the wires from being broken, and reduces the material cost. The switch box mounting structure includes a connector holder (43) having a pair of shaft receiving grooves (59) which are fixedly engaged with a mounting hole of a panel, a connector (45) including a housing having shafts (69) protruded therefrom, and a switch box (48). The connector is coupled to the connector holder (43) with the shafts (69) engaged with the shaft receiving grooves (59) in such a manner that the connector (45) is rotatable about the shafts (69). The switch box (48) is inserted into the connector holder (43) to engage with the connector (45), and has a pair of locking pawls (77) which are locked to the mounting hole (79). The locking pawls (77) protrude from opposite sides of the switch box which face in directions perpendicular to the shafts (69). It is preferable that the switch box mounting structure further include leaf springs (67) which are provided between the connector holder (43) and the connector (45) for urging the connector (45) to a neutral position at which the terminals are perpendicular to the panel (41).

9 Claims, 3 Drawing Sheets

SWITCH BOX MOUNTING STRUCTURE

BACKGROUND OF THE INVENTION

1. Field of the Invention

This invention relates to a structure of mounting a switch box (hereinafter referred to as "a switch box mounting structure", when applicable) which is so designed that, simultaneously to when the switch box is mounted on a panel, the engagement of a connector is achieved.

2. Related art

Plug-in type switch boxes such as for instance a hazard switch are mounted on a panel (such as an instrument panel) of an automobile. Heretofore, a switch box of this type is mounted on the panel as follows. As shown in FIG. 4, wires 5 are pulled outside (i.e., to the right side of panel 1) through is mounting hole 3 of the panel 1, and connector 7 connected to the wires 5 is engaged with a switch box 9. As a result, the connector 7 is connected to terminals 11 embedded directly in the switch box 9. Thereafter, the wires 5 are pushed back inside (i.e., to the left side of the panel 1) through the mounting hole 3, and elastic pawls 13 of the switch box 9 are locked to the edge of the mounting hole 3. Thus, the switch box 9 has been mounted on the panel. In the case of maintenance, the elastic locking pawls 13 are disengaged from the edge of the mounting hole 3 by prying the switch box 9 with a jig 14.

Hence, the above-described switch box mounting structure suffers from a problem that, whenever the switch box 9 is mounted on the panel, the wires 5 are pulled outside through the mounting hole, and the connector 7 is connected to the switch box 9, and then the wires 5 are pushed back through the mounting hole 3.

In order to overcome the above-described problem, Japanese Utility Model Publication No. 32969/1978 discloses a switch box mounting structure which is so designed that simultaneously to when a switch box is mounted, the engagement of a connector is accomplished. The conventional switch box mounting structure will be described with reference to FIG. 5. With the switch box mounting structure, a junction connector box 15 is fixedly engaged with a mounting hole 3 formed in a panel 1. The junction connector box 15 has a front opening 17, and a frame-shaped front plate 19 along the edge of the front opening 17. The junction connector box 15 further has locking pawls 21 and 21 on the outer surfaces of the upper and lower walls in such a manner that those locking pawls 21 are confronted with the front plate 19. When the junction connector box 15 is inserted into the mounting hole in the panel 1 beginning with the rear end portion, the edge of the mounting hole 3 is held between the front plate 19 and the locking pawls 21, so that the junction connector box 15 is fixedly secured to the panel 1.

The junction connector box 15 has side openings 23 in the side walls, and a pair of elongated grooves 25 in the inner surfaces of the upper and lower walls which are extended from the side openings 23. On the other hand, a connector 29, to which wires 27 are connected, has a flange 31 which is engaged with the aforementioned elongated grooves 25. The connector 29 is inserted into the junction connector box 15 as follows. After the junction connector box 15 is fixedly mounted on the panel 1, at the rear of the panel 1 the flange 31 is engaged with the elongated grooves 25 through the side opening 23.

After the connector 29 has been inserted into the junction connector box 15 in the above-described manner, at the front of the panel 1 a switch box 33 is inserted into the junction connector box 15. The switch box 33 thus inserted is secured to the junction connector box 15 with its elastic locking pawls 35 engaged with protrusions 37 of the junction connector box 15. At the same time, the terminals 38a of the switch box 33 are engaged with the terminals 38b of the connector 29. Thus, the electrical conduction of the switch box 33 is achieved with a knob 39.

In the above-described mounting structure, the connector 29 is secured to the panel 1 with the aid of the junction connector box 15. Hence, simultaneously to when the switch box 33 is mounted on the front surface of the panel 1, it can be connected to the connector 29. Thus, the mounting structure allows for efficient assembly.

However, the above-described mounting structure with the junction connector box 15 is disadvantageous in the following points. In the case where the switch box 33 is removed, for instance, for maintenance, the switch box 33 must be angled to unfasten the elastic locking pawls. In this case, since the connector 29 coupled to the switch box 33 is fixedly combined with the junction connector box 15, it is impossible to angle only the switch box 33, and the junction connector box 15 is also angled along with the connector 29. Hence, upon disengagement of the locking pawls 21, the connector 29 and the junction connector box 15 are removed as well. Therefore, it is necessary that the length of the wires 27 be longer than the length actually required, which is not economical. The extra length of the wires 27 gives rise to another problem that, in mounting the junction connector box 15 on the panel 1 again, is the portions of the wires 27 corresponding to the extra length may be crimped by the junction connector box 15 and the panel, possibly causing the wires to break.

In view of the foregoing, an object of the invention is to provide a switch box mounting structure with which it is possible to remove only the switch box from the panel, and it is not necessary that the wires be longer than the length actually required, which improves the work efficiency, prevents the wires from being broken, and reduces the material cost.

SUMMARY OF THE INVENTION

The foregoing object of the invention has been achieved by the provision of a switch box mounting structure which, according to the invention, comprises:

a connector holder, having a pair of shaft receiving grooves, which is fixedly engaged with a mounting hole of a panel;

a connector including a housing from two opposite side surfaces of which shafts are protruded, respectively, the connector being coupled to the connector holder with the shafts engaged with the shaft receiving grooves, in such a manner that the connector is rotatable about the shafts; and a switch box which is inserted into the connector holder to engage with the connector, and has a pair of locking pawls which are locked to the mounting hole, the locking pawls being protruded on both sides of the shafts in a direction perpendicular to the shafts.

It is preferable that the switch box mounting structure further comprises: urging means which are provided between the connector holder and the connector, urging the connector in a direction of swing so that a direction of insertion of terminals of the connector is perpendicular to the panel.

With the switch box mounting structure of the invention, the connector holder is fixedly engaged with the mounting hole of the panel, and the connector is coupled to the connector holder in such a manner that it is rotatable about the shafts. Under this condition, the switch box is inserted into the connector holder, so that the switch box is engaged with the connector held by the connector holder. In the case where the switch box is removed from the panel, for instance, for maintenance, the switch box is angled. In this operation, the connector engaged with the switch box is rotated about the shafts; that is, it is angled at the same angle as the switch box. Hence, the load attributing to the inclination of the switch box will never act on the connector holder.

The switch box mounting structure having the urging means between the connector holder and the connector, functions as follows: When, with the locking pawls loosened, the switch box is disengaged from the mounting hole, then the connector is urged by the elastic restoring forces of the leaf springs, so that it is rotated about the shafts so that the direction of insertion of terminals be perpendicular to the panel.

DETAILED DESCRIPTION OF THE INVENTION

A switch box mounting structure, which constitutes a referred embodiment of the invention, will be described with reference to the accompanying drawings in detail.

Figure 1:
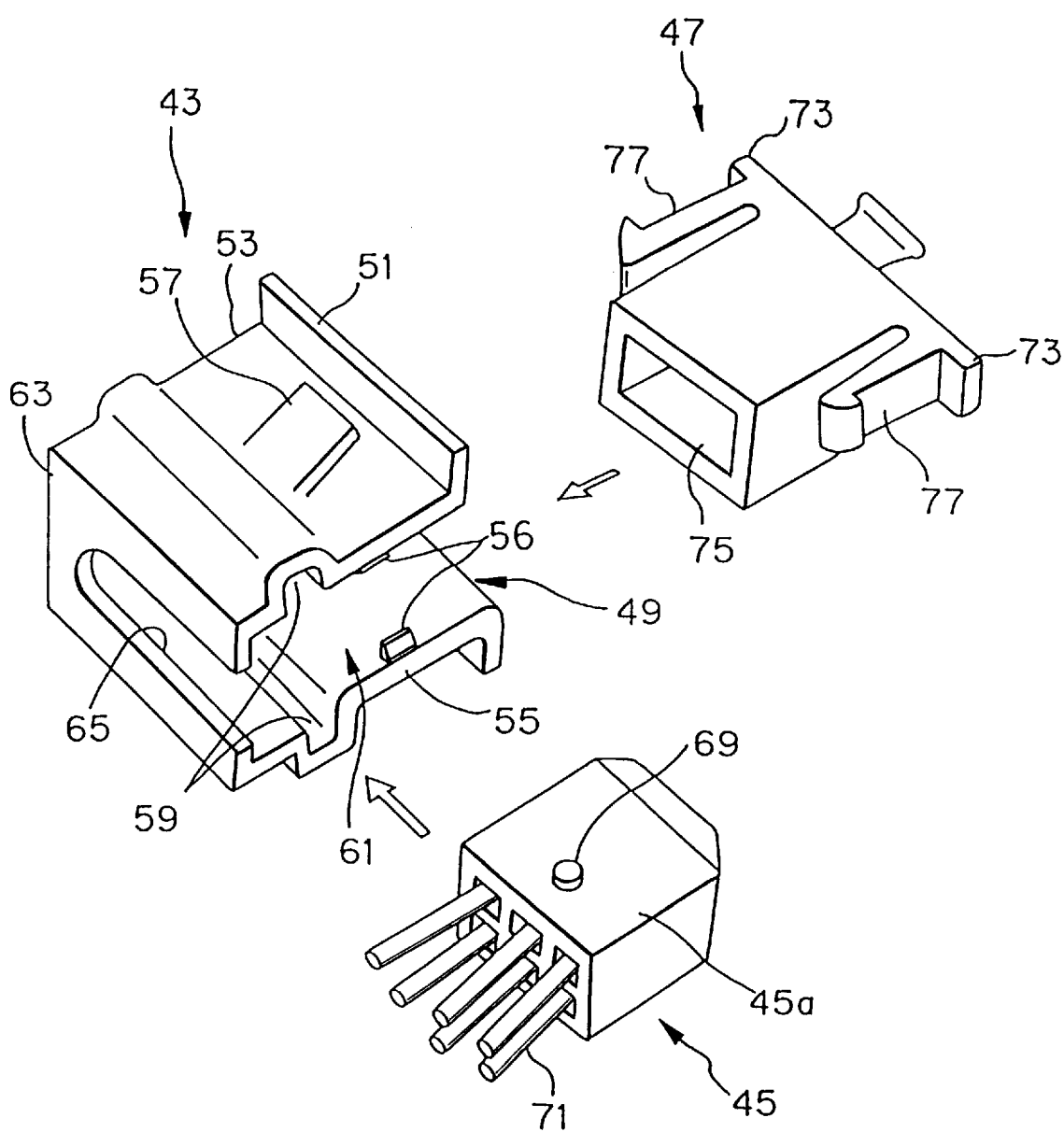
FIG. 1 is an exploded perspective view of a switch box mounting structure according to the invention.
Figure 2:
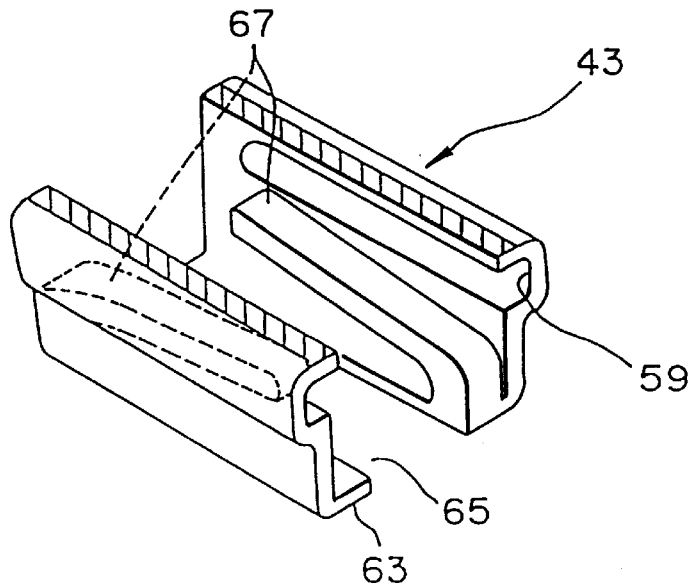
FIG. 2 is a perspective view showing the leaf spring members of a connector holder shown in FIG. 1.
Figure 3:
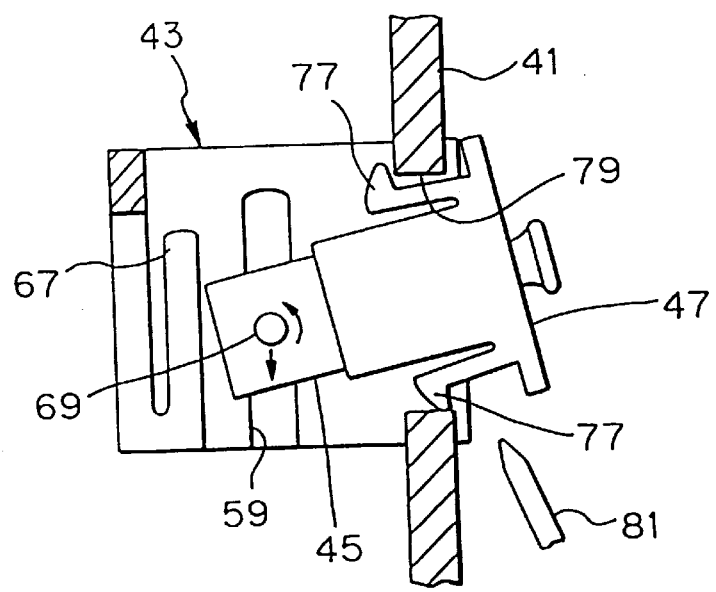
FIG. 3 is a sectional view for a description of the removal of a switch box from a panel in the case of the switch box mounting structure of the invention.
Figure 4:
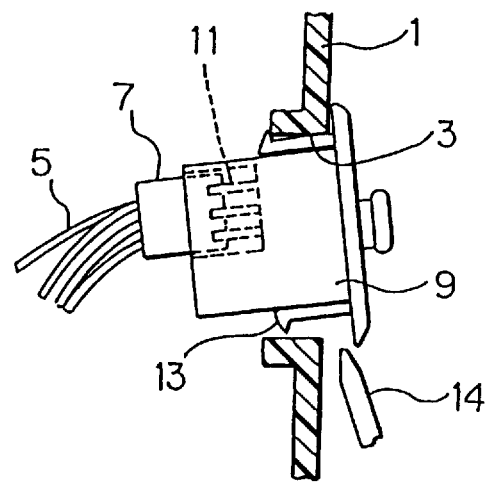
FIG. 4 is a sectional view showing a conventional witch box mounting structure.
Figure 5:
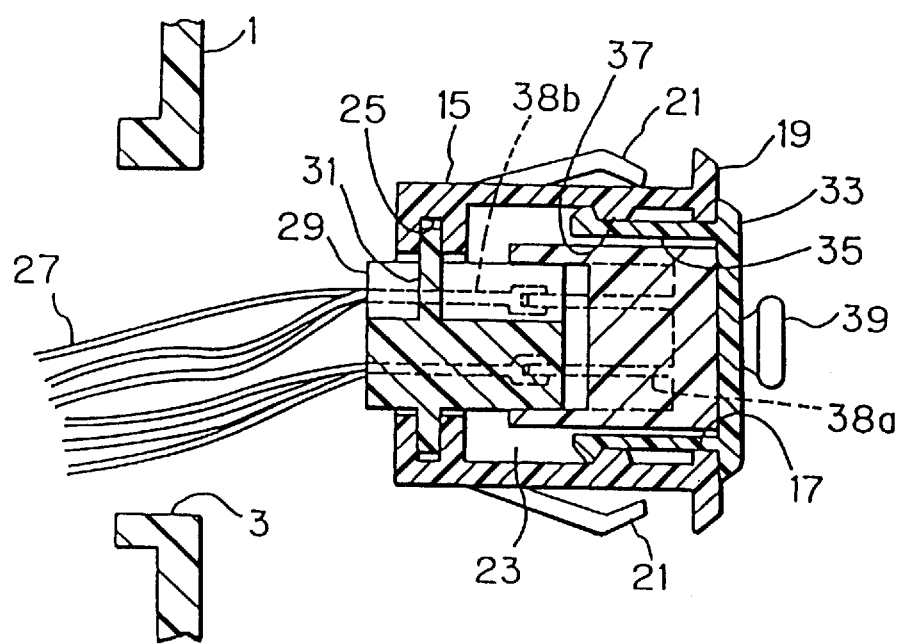
FIG. 5 is a sectional view showing a conventional witch box mounting structure with a junction connector box.

FIG. 1 is an exploded perspective view of the switch box mounting structure of the invention. FIG. 2 is a perspective view of leaf spring members in a connector holder shown in FIG. 1. FIG. 3 is a sectional view showing a state of a switch box which is being removed.

The switch box mounting structure, according to an embodiment of the invention, comprises a connector holder 43 fixedly mounted on a panel 41 (FIG. 3) a connector 45 held by the connector holder 43 and a switch box 47 which is inserted into the connector holder 43 through a front opening and engaged with the connector 45.

The connector holder 43 is a bracket which has a front opening 49 and opposing side openings 61, thus being substantially U-shaped in a side view. The connector holder 43 has front flanges 51 which define the front opening. The front flanges 51 are obtained by bending the upper and lower walls 53 and 55 of the connector holder 43. The upper and lower walls 53 and 55 have a pair of flexible panel-locking pawls 57 on the outer surfaces in such a manner that they are protruded towards the front flanges 51. Furthermore, the upper and lower walls 53 and 55 have a pair of shaft receiving grooves 59 formed in the inner surfaces in such a manner that the grooves 59 are in parallel with each other and communicate with the two (right and left) side openings 61.

The connector holder 43 further includes a rear wall 63 having a U-shaped slit 65 which is continuous to one of the side openings. Furthermore, the connector holder 43 includes a pair of urging means, namely, leaf spring members 67 which are formed on the inner surface of the rear walls 63 in such a manner that they are in parallel with each other. The leaf spring members 67 have base end portions fixedly coupled to the rear walls, and their remaining end portions are free end portions. Those leaf spring members 67 are so arranged that the free end portions are located on the opposite sides; more specifically, the free end portion of one of the leaf spring members 67 is provided on the side of one side opening 61, while the free end portion of the other leaf spring member is provided on the side of the other side opening 61 (FIG. 2). The leaf spring members are elastically deformable in such a manner that the free ends are movable to and from the rear wall 63.

The connector 45 is inserted into the connector holder 43 through the side opening 61 (which is continuous to the slit 65). Locking protrusions 56 are formed on the connector-lead-in end of the side opening to prevent the unintentional removal of the connector 45. The connector housing 45a has shafts 69 which protrude from both side walls in such a manner that the shafts 69 are coaxial. The shafts 67 are inserted into the shaft receiving grooves 59 when the connector 45 is inserted into the side opening 61. At the same time, wires 71, extending from the rear end face of the connector 45, are inserted into the slit 65. The connector 45, inserted into the connector holder 43, abuts against the free ends of the pair of leaf spring members 67. In addition, the connector 45 abuts against the locking protrusions 56 so that it is prevented from coming off.

The switch box 47 is inserted into the connector holder 41, mounted on the panel 41, through the front opening 49. The switch box 47 has a pair of flanges 73 at the front end. The flanges 73 abuts against the front surface of the panel 41 when the switch box 47 is fitted in the connector holder 43. The switch box 47 has an engaging opening 75 in the rear end face, through which the connector 45 is engaged with the switch box. In the engaging opening 75, terminals (not shown) are provided which are directly connected to the terminals (not shown) of the connector 45.

A pair of locking pawls 77 protrude from the flanges 73 in the direction of insertion of the switch box 47 so that they are positioned at the side openings 61 of the connector holder 43. Hence, when the switch box 47 is inserted into a mounting hole (FIG. 3) formed in the panel 41, the locking pawls 77 are locked to the rear surface of the edge portion of the mounting hole 79 directly, not interfering with the connector holder 43.

The pair of locking pawls 77 are positioned at the side openings 61 of the connector holder 43. More specifically, the locking pawls 77 are so positioned that they engage the panel in directions perpendicular to the common axis of the shaft 69.

Now, the function of the switch box mounting structure will be described.

First, the connector holder 43 is inserted into the mounting hole 79 of the panel 41 from the front (i.e., the right side of panel 41 in FIG. 3). In this operation, the rear wall 63 of the connector holder is inserted into the hole 79 is first. Hence, the panel locking pawls 57 are elastically deformed, so that the front flanges 51 and the panel locking pawls 57 retain the edge portion of the mounting hole 79 from both sides. Thus, the connector holder is fixedly secured to the panel 41.

Behind the panel, the connector 45 is slidably inserted into the connector holder 43 through the side opening 61 which has been secured to the panel 41. As a result, the shafts 69 of the connector 45 are inserted into the shaft receiving grooves 59, while the rear wall of the connector 45 abuts against the free ends of the pair of leaf spring members 67. In this operation, the free ends of the leaf spring members 67 are abutted against the rear end face of the connector 45 on both sides of the shafts 69, and the connector 45 is so positioned that urging forces on both sides of the common axis of the shafts 49 are equal to each other, and the direction of insertion of the terminals are perpendicular to the surface of the panel 41.

Under this condition, the switch box 47 inserted into the mounting hole 79 of the panel 41 is inserted into the connector holder 43. The switch box 47 thus inserted is engaged with the connector 45 which is so arranged that the direction of insertion of terminals is perpendicular to the surface of the panel 41, as noted above. At the same time, the locking pawls 77 of the switch box 47 are locked to the rear surface of the edge of the mounting hole 79. Thus, the switch box 47 has been secured to the panel 41 with the aid of the locking pawls 77.

For maintenance purposes, it may be necessary to remove the switch box 47 from the panel 41. In this case, the switch box is removed from the panel as follows. First, as shown in FIG. 3, with one of the locking pawls 77 of the switch box 47 pried with a jig, the switch box 47 is angled so that the locking pawl 77 is unlocked from the panel 41.

In this operation, the connector 45, engaged with the switch box 47, is slid downwardly in the direction of the shaft receiving grooves 59 with the aid of the shafts 69, and also rotated about the shafts 69 against the elastic forces of the leaf spring members 67, so that the connector 45 is angled through the same angle as the switch box 47. Hence, the load attributing to the inclination of the switch box 47 does not act on the connector holder 43. That is, the connector holder 43 is held secured to the panel 41 without the panel locking pawls not being unlocked from the panel 41.

When, with the pair of locking pawls 77 unlocked from the panel, the switch box 47 is disengaged from the mounting hole 79, both side portions of the rear end face of the connector 45, which are on both sides of the axis of the shafts 69, are urged by the elastic forces of the leaf spring members 67 again, so that the connector 45 is rotated about the axis of the shafts 69 so that the direction of insertion of terminals is perpendicular to the surface of the panel 41.

With the switch box mounting structure thus designed, the connector holder 43 is secured to the panel 41, and the connector 45 is rotatably coupled to the connector holder 43. Hence, when the switch box 47 is removed from the panel 41, even if the switch box 47 is angled, the connector 45 is rotated with the inclination of the switch box 47. Hence, the load attributing to the inclination of the switch box 47 does not act on the connector holder 43, so that the connector holder 43 will never come off the panel 41.

Hence, the connector 45 may be maintained held on the panel 41; that is, it is possible to remove only the switch box 47 from the panel 41. The maintenance can be achieved with high work efficiency.

Furthermore, with the switch box mounting structure, it is unnecessary to pull the connector 45 out of the mounting hole 79. This feature eliminates the difficulty that, when the connector holder is mounted again, the wires 71, being clamped, are broken. In addition, it is unnecessary to make each wire 72 longer than the length actually required, which contributes to a reduction in material cost.

In the above-described embodiment of the invention, the leaf spring members 67 are provided between the connector holder 43 and the connector 45, and the connector 45 which is rotatable about the shafts 49 is so urged that the direction of insertion of terminals is perpendicular to the surface of the panel 41. Therefore, even after the removal of the switch box 47, the connector 45 can be automatically arranged at the position most suitable for the next engagement of the switch box 47 (at the position where the direction of insertion of terminals is perpendicular to the surface of the panel 41).

As is apparent from the above description, the switch box mounting structure is advantageous in the following point. Even if the switch box is angled to remove it from the panel, the connector is rotated following the inclination of the switch box, so that the load attributing to the inclination of the switch box will never act on the connector holder, so that the connector holder will never come off the panel. Hence, the connector can be maintained on the panel; that is, only the switch box can be removed from the panel, which improves the work efficiency. Furthermore, it is unnecessary to pull out the connector. Hence, the switch box mounting structure is free from the difficulty that, when the connector holder is mounted again, the wires, being clamped, are broken. In addition, it is unnecessary to make each wire longer than the length actually required, which contributes to a reduction in material cost.

With the switch box mounting structure in which the elastic means are provided between the connector holder and the connector, the connector which is rotatable about the shafts is so urged that the direction of insertion of terminals is perpendicular to the surface of the panel. Hence, even after the removal of the switch box, the connector is held most suitable in posture.

What is claimed is:

1. A switch box mounting structure, comprising:

a connector holder having a pair of shaft receiving grooves in opposite first and second sidewalls thereof and including retaining means for retaining said connector holder in a mounting hole of a panel, said connector holder defining a space therein;

a connector including a housing having electrical terminals therein, said housing including a pair of shafts respectively extending from opposite sides thereof, said connector being received in said space and coupled to said connector holder with said shafts engaged with said shaft receiving grooves in such a manner that said connector is rotatable about said shafts; and a switch box insertable into said connector holder to engage with said connector, said switch box having a pair of locking pawls which are locked to edges of said panel defining said mounting hole, said locking pawls being respectively located on opposite sides of said panel which face in directions perpendicular to said shafts.

2. A switch box mounting structure as claimed in claim 1, further comprising:

urging means for urging said connector to a neutral position in said connector holder at which said terminals extend perpendicular to the plane of said panel.

3. A switch box mounting structure as claimed in claim 2, wherein said urging means is disposed between said connector holder and said connector.

4. A switch box mounting structure as claimed in claim 3, wherein said urging means is secured to said connector holder.

5. A switch box mounting structure as claimed in claim 4, wherein said urging means includes a pair of cantilevered leaf springs extending from a bottom wall of said connector holder and into said space so as to abut against a bottom surface of said connector.

6. A switch box mounting structure as claimed in claim 5, wherein said cantilevered leaf springs extend in opposite directions with respect to each other.

7. A switch box mounting structure as claimed in claim 1, wherein said shafts are slidable along said grooves.

8. A switch box mounting structure as claimed in claim 1, further comprising locking means for locking said connector in said connector holder.

9. A switch box mounting structure as claimed in claim 1, wherein a third sidewall of said connector holder has an opening for through which said connector is inserted, said third sidewall being perpendicular to said first and second sidewalls.

* * * * *